A. KOVÁCS.
TABLE LEVELER.
APPLICATION FILED MAY 2, 1908.

934,546.

Patented Sept. 21, 1909.

WITNESSES:
S. Birnbaum
C. R. Radcliff

INVENTOR
Alexander Kovács
BY
Sigmund Herzog
his ATTORNEY

UNITED STATES PATENT OFFICE.

ALEXANDER KOVÁCS, OF SHARON, PENNSYLVANIA.

TABLE-LEVELER.

934,546.

Specification of Letters Patent. Patented Sept. 21, 1909.

Application filed May 2, 1908. Serial No. 430,614.

*To all whom it may concern:*

Be it known that I, ALEXANDER KOVÁCS, a subject of the King of Hungary, and resident of Sharon, in the county of Mercer and State of Pennsylvania, have invented certain new and useful Improvements in Table-Levelers, of which the following is a specification.

The present invention relates to improvements in devices for leveling tables and the like, and has for its object to provide a simple, inexpensive device of this character, which may be easily applied to the table on which it is desired to be used.

Many devices have been heretofore used, usually comprising screw bolts and nuts. One of these elements is usually fixedly secured to the table, while the other is rotatably arranged and may be rotated by means of a suitable tool, such as an operating lever. It is obvious that when such a table stands in the corner of a room, or on some other place where not much space is left for turning a comparatively large operating lever, it will be very difficult to adjust the level of the table, and in many instances it will be necessary to remove the table in order to have space for operation.

The present invention now provides a table leveling device which does away with the rotatable screw elements and does not need, therefore, an operating lever, but comprises a rack and pinion adjustment, the pinion of which may be operated by a socket wrench, not needing much space for operation.

The invention is illustrated in the accompanying drawings, in which—

Figure 1:
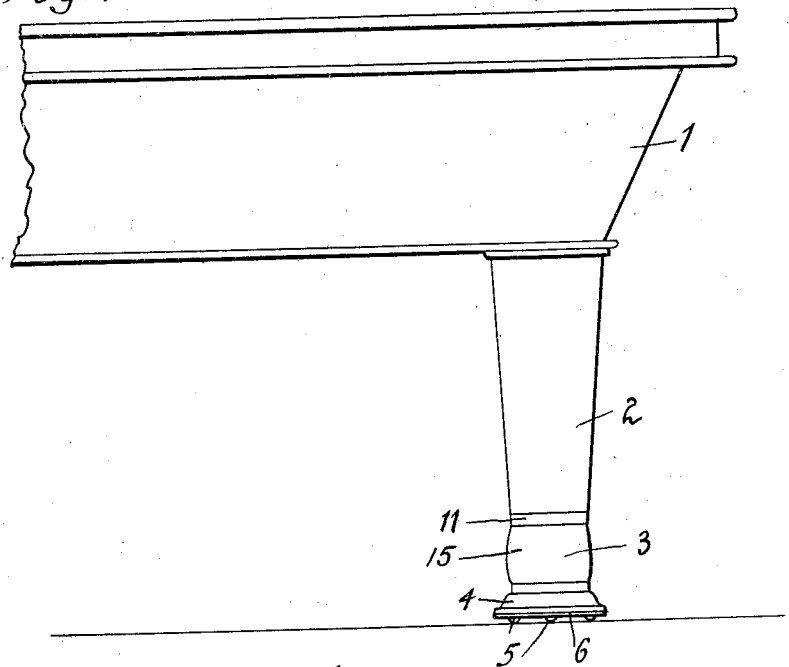
Figure 2:
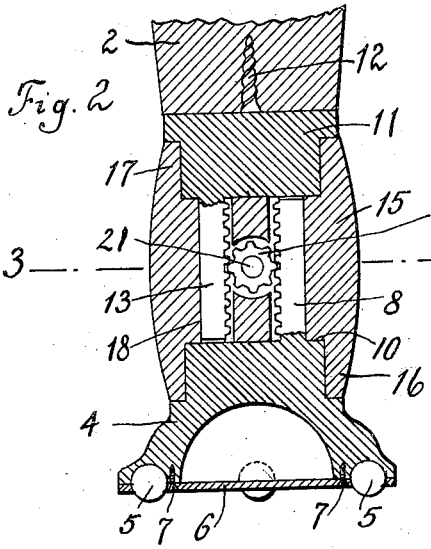
Figure 3:
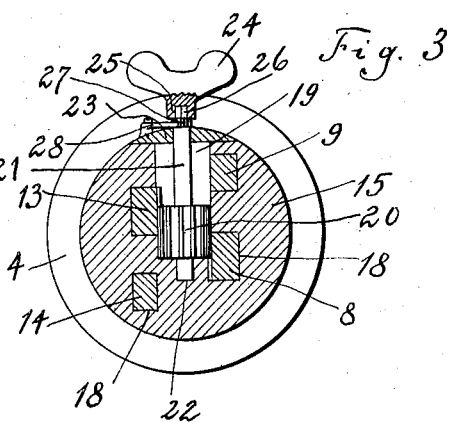

Figure 1 is a side elevation of a portion of a table, having its leg equipped with the leveling device, embodying the invention. Fig. 2 is a vertical section of part of the leg and the device, and Fig. 3 is a horizontal section on line 3, 3 of Fig. 2.

In the drawings, 1 indicates a billiard table, there being but a part illustrated in the drawings, and 2 denotes one of the legs of the usual construction, attached to the table in any suitable manner.

To the lower end of the leg 2 is attached the leveling device 3. This leveling device comprises a base 4, resting on a plurality of balls 5, arranged thereon in any suitable manner known in the art. In this particular case a holding plate 6 is provided, secured to the base by means of screws 7, 7. To the base 4 are attached, or preferably made integral with the same, a rack 8 and a guide-rod 9, preferably of quadrangular cross section. Both the rack 8 and the guide-rod 9 project from the upper face 10 of the base 4 and are arranged parallel to the axis of the table leg 2. A block 11, similar to the base 4, is attached to the table leg 2, preferably by means of a screw 12, and has arranged thereon a rack 13 and a guide-rod 14, in the same manner as the rack and guide-rod of the base.

It is obvious that the rack and guide-rod of the block 11 must be located in planes not coinciding with the planes of the rack and guide-rod of the base 4, so as not to interfere with the same.

A substantially cylindrical member 15 is provided and arranged thereon is a downwardly extending flange 16, fitting the upper portion of the base 4, which portion is reduced in diameter, and an upwardly extending flange 17, fitting the lower portion of the block 11, which portion is also reduced in diameter. Through the whole length of this cylindrical member extend rectangular holes 18, 18, adapted to receive the racks and guide-rods, hereinbefore described. The cylindrical member 15 is furthermore provided with a recess 19, arranged at right angles to the axis of the same, in which recess is located a pinion 20, fixedly secured to a shaft 21, the latter being journaled in the cylindrical member at 22, and in a plate 23, secured to the cylindrical member. The pinion 20 meshes with the racks 8 and 13, and may be rotated by means of a wrench 24, the socket 25 of which engages the square head 26 of the shaft 21.

In order to prevent the backward rotation of the pinion 20, the shaft of the same is provided, preferably on its outer end, with a ratchet 27, in operative engagement with a pawl 28, pivoted to the plate 23.

The operation of this device is obvious. When it is desired to raise the level of the table, the wrench 24 is brought into engagement with the square head 26, and the pinion turned, whereby one of the racks, that is rack 13, will be raised and the other of the racks, that is rack 8, will be lowered. The ratchet and pawl arrangement prevents the backward movement of the pinion and thus the downward and upward movement of the racks, keeping thereby the level of the table in a predetermined height. Should it be desired to lower the level of the table, then, first, the pawl is disengaged with the ratchet, second, the pinion rotated until the desired level is obtained and, finally, the pawl brought again into engagement with the ratchet. It will be observed that the base, which rests on the floor or carpet does not rotate, and thus does not injure the same. After the desired level is attained, the wrench may be taken off, so as not to impair the appearance of the table.

It is obvious that the square head does not necessarily project from the cylindrical member, but may be located within the same together with the ratchet and pawl.

What I claim is:

1. In a table leveling device, the combination with a table leg, of a block secured thereto, a base plate, an intermediate member between said block and said base plate and having a plurality of holes therein, a rack and a guide on said block, a rack and a guide on said base plate, said racks and guides sliding in said holes, a pinion on said intermediate member and meshing with said racks, and means adapted to rotate said pinion.

2. In a table leveling device, the combination with a table leg, of a cylindrical block secured thereto and having its lower end reduced in diameter, a base plate having its upper end reduced in diameter, an intermediate member between said block and said base plate and having a plurality of holes therein, flanges on the upper and lower ends of said intermediate member and fitting the reduced parts of said block and base plate, a rack and guide on said block, a rack and guide on said base plate, said racks and guides sliding in said holes, a pinion on said intermediate member and meshing with said racks, and means adapted to rotate said pinion.

Signed at Sharon, in the county of Mercer and State of Pennsylvania, this 31st day of March, A. D. 1908.

ALEXANDER KOVÁCS.

Witnesses:
VÉMETH SÁNDOR,
A. WINKLEY.